Dec. 24, 1940.　　　H. E. LA BOUR　　　2,226,001
GLAND
Filed May 6, 1938

Inventor:
Harry E. LaBour
By Brown Jackson Boettcher Dienner
Att'ys

Patented Dec. 24, 1940

2,226,001

UNITED STATES PATENT OFFICE 2,226,001

GLAND

Harry E. La Bour, Elkhart, Ind.

Application May 6, 1938, Serial No. 206,425

5 Claims. (Cl. 286—11)

This invention relates to packing glands for centrifugal pumps and the like, and particularly concerned with rotary pumps and similar equipment. While it is particularly designed for handling corrosive liquids, because their leakage must be an absolute minimum, it is also useful for general purposes.

The object and general purpose of this invention is to provide a gland seal for a shaft or the like in which there is a ground joint between two relatively movable parts, preferably two plain surfaces affording metal-to-metal contact, one part having a sealed floating connection with the casing through which the shaft extends. A feature of this invention is the provision of a flexible sealing diaphragm of rubber or rubberlike material which is capable of universal movement and has one end connected to the casing and the other connected to a ring or the like which sealingly seats against a shoulder on the shaft, in connection with means which has a floating connection with the casing for pressing the sealing diaphragm and ring against the shaft shoulder and holding the diaphragm and ring against rotation with the shaft, but which nevertheless is capable of accommodating any eccentricity in the shaft without disturbing the tight seal provided by the gland.

Another feature of this invention is the provision of an inner sleeve which maintains the sealing ring and diaphragm in leak-tight relation with the shaft and which has limited universal movement in a mounting ring or sleeve which keeps the inner sleeve and ring from rotating but which permits them to follow any eccentricities of the shaft.

A further feature of this invention is the provision of an internally lubricated seal which reduces wear and equalizes and reduces the temperature of the parts during operation.

Another important feature is the provision of means for circulating lubricant through the gland, and, in this connection, it is a feature of this invention to provide for the circulation of the lubricant by the action of the impeller shaft on the lubricant within the gland.

Another feature is the provision of a gland construction embodying two seals, one being principally effective to prevent leakage of the pumped fluid and the other spaced therefrom and arranged to provide a seal holding lubricant within the gland to thereby reduce the friction at the points of contact and increase the effectiveness and longevity of the seal.

Still further, another feature is the provision of a gland structure which need not be disassembled when removing the impeller shaft from the pump casing, or vice versa.

These and other objects and advantages of this invention will be apparent to those skilled in the art after a consideration of the following detailed description taken in conjunction with the accompanying drawing illustrating the preferred structural embodiment.

Figure 1:
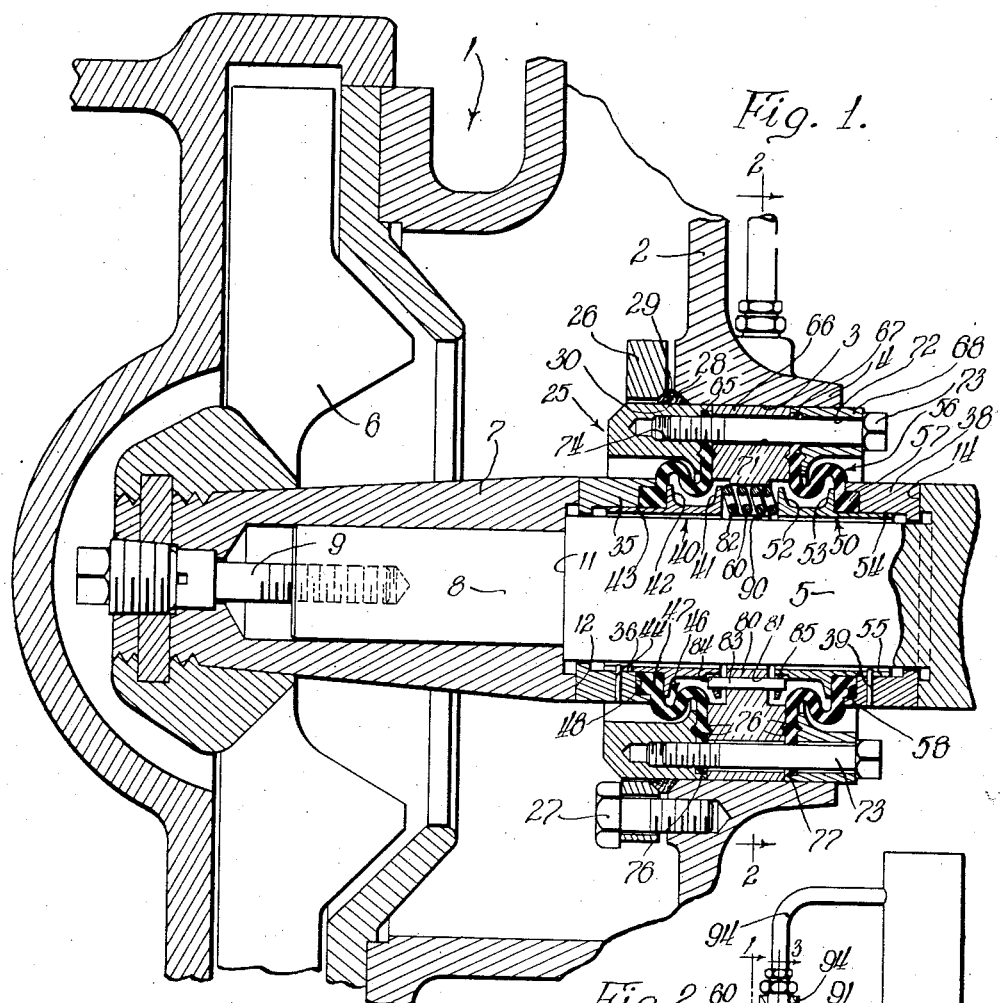
Figure 1 is a fragmentary section taken longitudinally through the impeller shaft and associated parts of a pump embodying the principles of my invention, the parts of the gland being shown as corresponding to a section taken along the line 1—1 of Figure 2.
Figure 3:
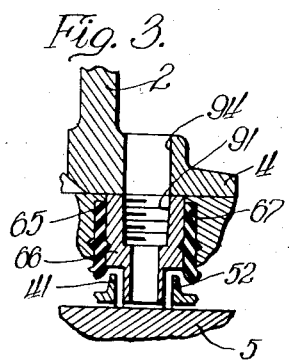
Figure 3 is a fragmentary section taken at an enlarged scale along the line 3—3 of Figure 2.

Referring now more particularly to Figure 1, the pump casing is indicated at 1 and includes a wall 2 provided with an opening 3 which is surrounded by a flange 4 and through which an impeller shaft 5 extends. Preferably, the pump impeller 6 is formed separately from the shaft 5 and has an axially bored hub 7 formed of any suitable material. The impeller hub is mounted on a reduced end 8 of the shaft by any suitable means, such as a bolt or cap screw 9 threaded into the end 8 of the shaft. A screw plug 10 threaded into the outer end of the impeller hub 7 locks the screw 9. The shaft 5 is shouldered, as at 11, to receive the inner end of the impeller hub 7. While the impeller 6 and hub 7 have been described as formed separately from the impeller shaft 5, it is to be understood that either or both of these parts may be formed intergrally with the shaft 5, if desired. Where the pump is particularly adapted to handle corrosive liquids and the like, the impeller 6 and hub 7 are formed of corrosion resistant material, usually in the form of a special alloy, and the axially facing shoulder 12 at the inner end of the hub 7 is stellited or otherwise hardened. At its outer end the shaft 5 carries or is formed with another axially facing shoulder 15 which is spaced from the shoulder 12. If desired, the shoulders 12 and 14 may be provided by collars or the like secured to the shaft. The shaft 5 is connected in any suitable manner to a motor or other driving means.

A mounting sleeve 25 is disposed in the opening 3 of the casing wall 2 and is held in place therein by a clamping collar 26 fastened to the pump casing 2 by cap screws 27, the casing 2 and the collar 26 having grooves 28 and 29 formed therein, respectively, to receive packing 30 so that when the cap screws 27 are tightened the sleeve 25 is held firmly in the desired position in the opening 3 and in leak-tight relation with respect to the casing 2.

As will be clear from Figure 1, a sealing ring 35, the external diameter of which is materially less than the internal diameter of the sleeve 25, is mounted about the shaft 5 and is disposed in sealing engagement with the shoulder 12. The sealing ring 35 may be formed of some hard, non-fibrous material, and preferably is stellited, like the collar 12. If desired, the ring 35 may be formed of carbon or other suitable material. One or more pins 36 are pressed into radial holes in the ring 35 and are welded or otherwise secured in place. A similar ring 38 surrounds the shaft 5 outwardly of the casing and is disposed in sealing relation against the outer shaft shoulder 14. The ring 38 is also provided with one or more radially inwardly extending pins 39. Preferably, although not necessarily, the rings 35 and 38 are identical, and the sealing surfaces thereof, together with the surfaces on the shoulders 12 and 14, are ground accurately to lie in planes at right angles to the axis of rotation of the shaft 5. If desired, lugs may be employed instead of the pins 36 and 39, and they may be carried by the sleeves 40 and 50, with slots or the like in the sealing rings 35 and 38.

An inner retainer sleeve 40 is provided with flanges 41 and 42 and a skirt section 43 which is piloted in the sealing ring 35 and in which there is one or more slots or jaws 44 that receive the inner end of the pins 36. The inner shoulder 42 is adapted to seat against the inner end of a flexible diaphragm 46 which is formed of rubber or rubber-like material. The inner end of the diaphragm 46 is thickened or beaded, as at 47, and the outer end of the sealing ring 35 is formed with a groove 48 to receive the diaphragm end 47.

An outer retainer sleeve 50 is provided with inner and outer flanges 52 and 53 and a skirt section 54 which is piloted in the sealing ring 38 and has one or more slots 55 to receive the pins 39. A flexible diaphragm 56 has a thickened or beaded outer edge 57 which is disposed in a groove 58 formed at the inner end of the sealing ring 38. A plurality of springs 60 are disposed between the adjacent flanges 41 and 52 of the retainer sleeves 40 and 50 and exert a force holding the edges 47 and 57 of the flexible diaphragms 46 and 56 against the respective sealing rings 35 and 38, thus holding the latter in sealing engagement with the shoulders 12 and 14 on the impeller shaft 5. As many springs 60 may be provided as desired, and by way of illustration I have shown the gland as having four springs (Figure 2), although this may vary. If desired, the inner ends of the diaphragms 46 and 56 may be vulcanized or otherwise permanently secured to the sealing rings 35 and 38. The pin-and-slot connection between the sealing rings 35 and 38 and the inner sleeves 40 and 50 permits a limited amount of universal and lateral movement of the rings relative to the sleeves.

The outer flange 65 of the inner flexible diaphragm 46 is held against the outer face of the ring or sleeve 25 by a spacing ring 66, and the outer flange 67 of the outer flexible diaphragm 56 is held against the other face of the spacing ring 66 by a clamping ring 68. The spacing ring 66 and the clamping ring 68 are provided with openings 71 and 72 through which a plurality of clamping screws 73 extend. The inner ends of the clamping screws 73 are threaded into tapped openings 74 formed in the inner sleeve 25. The sleeve 25 and the spacing and clamping rings 66 and 68 have the same external diameter so that the packing 30 and ring 26 will seal the gland unit in different positions within the opening 3 of the pump casing.

The clamping surfaces on the members 25, 66 and 68 are provided with grooves 76 which cooperate with the outer flanges 65 and 67 of the diaphragm members in establishing a liquid-tight seal at these points. Uniform compression of the diaphragms is secured by having flanges 76 and 77 on the parts 25 and 68 which engage the spacing ring 66 when the screws 73 are drawn tight. The construction also insures correct alignment of the gland parts.

The spacing ring 66 is provided with a radially inwardly extending flange 80 having a pair of holes 81 and four holes 82 formed therein. Pins 83 are pressed into the holes 81 and extend axially outwardly of the flange 80. The adjacent flanges 41 and 52 of the retainer sleeves 40 and 50 are provided with enlarged openings 84 and 85, respectively, in which the ends of the pins 83 are loosely received. The holes 82 loosely receive the springs 60 which also press the retainer sleeves outwardly and hold the sealing rings 11 and 38 against the shoulders 12 and 14. The pins 83 hold the retainer sleeves 40 and 50 against rotation, and the sleeves 40 and 50, in turn, hold the sealing rings 11 and 38 against rotation, but since the diaphragms 46 and 56 are flexible and the connection between the sleeves 40 and 50 and the spacing ring 66 is in the nature of a connection that affords limited universal movement between the sleeves 40 and 50 and the ring 66 that anchors them to the pump casing, the sealing rings 11 and 38 and the sleeves 40 and 50 are capable of moving axially or angularly with the shaft 5 relative to the casing 2. Thus, any eccentricity in the shaft 5 will not affect the tight seal provided by the rings 35 and 38 under the bias of the springs 60 which press them outwardly into engagement with the shoulders 12 and 14 at all times.

The inner flexible diaphragm 46 has its inner surface in communication with the interior of the pump, so that it is subjected to pressure or to suction, according to whether pressure or suction exists on the interior of the pump, but in order to insure that there will be no tendency for movement of the central portion of the member 46 to pull the end 47 away from the sealing ring 35, or the ring 35 away from the shoulder 12, the movement of the diaphragm is limited by the adjacent portions of the sleeve 25 and retainer sleeve 40. Similarly, movement of the outer diaphragm 56 is limited by the retainer sleeve 51 and the clamping ring 73.

Figure 2:
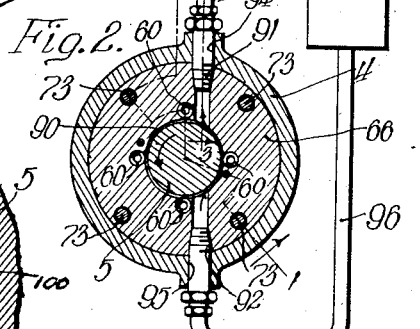
Figure 2 is a section taken at a reduced scale along the line 2—2 of Figure 1, showing somewhat diagrammatically the means for circulating oil or other lubricant through the gland.

The retainer sleeves 40 and 50 and the sealing rings 35 and 38 are slightly larger than the diameter of the shaft 5 between the shoulders 12 and 14, thereby providing a chamber 90 which is adapted to receive lubricant, which reaches the sealing surfaces at 12 and 14, which, as mentioned above, are ground so as to be perfectly planar radially of the shaft. The lubricant also reduces wear, keeps the gland cool, and equalizes the temperature in the various parts thereof. In order to provide for a continuous circulation of lubricant through the chamber 90, the construction best shown in Figure 2 is employed. From this figure it will be noted that tapped openings 91 and 92 are formed in the spacer ring 66 and corresponding openings 94 and 95 in the casing flange 4 register therewith. The openings 91 and 92 lead into the chamber 90 and are disposed slightly to the right of the vertical center line passing through the gland. A tube 94 is inserted through the opening 94 and screwed into the opening 91. At its upper end the tube 94 leads into an oil reservoir 95. A generally U-shaped tube 96 leads from the bottom of the reservoir 95 and extends up through the opening 95 and into the opening 92. Any suitable fittings may be employed for establishing these connections.

In operation, the shaft 5 rotates in the direction of the arrow shown in Figure 2, and the action of the rotating shaft draws oil into the chamber 90 from the pipe 96 through the lower opening 92 and forces oil out through the opening 91 into the pipe 94, thus maintaining a continuous circulation of oil through the chamber 90. The movement of the oil is indicated by the small arrows in Fig. 2. Oil circulating through the chamber 90 also moves axially in opposite directions to lubricate the contact surfaces on the sealing rings and shoulders on the shaft, reducing wear at these points and keeping the gland cool.

Tightening the cap screws 73 after the gland is assembled draws the clamping ring 68 against the spacing ring 66 and the latter against the sleeve 25, clamping the diaphragm flanges 65 and 67 firmly therebetween. However, in order that when full compression has been applied by the screws 73 no further compression of the flanges 65 and 67 is possible, the flanges 76 and 77 are arranged to engage the ring 66, thus insuring uniform compression on the rubber members and also correct alignment of the gland parts. When the gland parts are thus clamped together, the springs 60 act against the retainer sleeves 40 and 50 to press the diaphragms into firm contact with the sealing rings 35 and 38, pressing the sealing rings into firm contact with the shoulders 12 and 14 on the shaft 5, thereby preventing any leakage of liquid within the pump from passing through the seal 12, 35, being aided in this action by the presence of lubricant within the space 90. The lubricant is retained in the chamber 90 by virtue of the sealing contact between the outer sealing ring 38 and the shoulder 14.

It will be noted that the packing gland construction has a diameter no larger than the diameter of the opening 3 in the pump casing and, by virtue of this construction, by loosening the nuts 27 the impeller shaft 5 and the entire gland assembly may be removed from the pump casing 2 without disassembling the gland itself, or, if the shaft 5 is fixed to a motor or the like, by removing the impeller 6 and loosening the ring 26, the pump casing may be removed from the shaft 5 and the gland assembly, leaving the latter intact.

Figure 4:
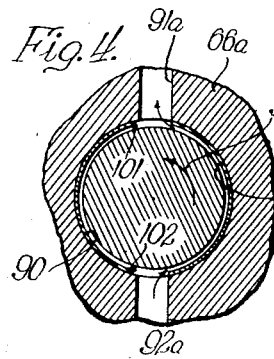
Figure 4 is a section similar to Figure 2, showing a modified form of means whereby the rotation of the shaft produces oil circulation through the gland.

Figure 4 illustrates a slightly modified form of oil circulating means. In the form of invention shown in this figure, the ring 66a is provided with openings 91a and 92a in diametrically opposed relation. A sleeve 100 is disposed adjacent these openings and is provided with portions 101 and 102 which are bent radially inwardly, as indicated, to a point closely adjacent the shaft 5. The latter rotates in the direction of the arrow shown in this figure and the upper portion 101 causes some of the oil film that is drawn around by the shaft rotation to move upwardly into the opening 91a. The other portion 102 retards the movement of oil film with the shaft so that as the oil or other lubricant moves out to the opening 91a, additional oil flows into the chamber 90a through the opening 92a, as indicated by the small allows in this figure.

While I have shown and described above the preferred structure in which the principles of my invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A packing gland for a shaft which passes through a casing wall, comprising a pair of axially spaced shoulders on said shaft, a pair of sealing rings disposed against said shoulders flexible means comprising tubular diaphragms of rubber like material connected to said sealing rings and to said casing wall in leak-tight relation, and lubricant impelling means for circulating lubricant through the interior of said flexible means for lubricating and cooling the area of contact between said sealing rings and said shoulders, said lubricant impelling means comprising a part of the shaft disposed between said shoulders.

2. A packing gland construction for a pump having a casing and an impeller shaft extending therethrough, comprising means serving as a pair of spaced apart axially facing shoulders on the shaft, rigid sleeve means disposed between said shoulders, a central ring ot which said rigid sleeve means are connected, a sealing ring engaging each shoulder and having portions cooperating with said rigid sleeve means to prevent rotation of said sealing rings relative thereto, a pair of flexible sleeves, each having a radially outwardly extending flange at one end disposed against said central ring and a radially inwardly extending flange at the other end, the radially inwardly extending flange on one sleeve being disposed against one of said sealing rings and the radially inwardly extending flange on the other flexible sleeve being disposed against the other sealing ring, springs pressing the radially inwardly extending flanges of said flexible sleeves against said sealing rings and serving thereby to press said sealing rings into sealing engagement with said shoulders on the shaft, said rigid sleeve means being spaced a small distance from said shaft and there being an aperture in said central ring communicating with the space between the rigid sleeve and said shaft, means for introducing lubricant into said space, and means passing through said central flange and the outwardly extending flanges of said flexible sleeves for clamping them in leak-tight relation to said casing.

3. A packing gland construction for sealing a rotatable shaft to the casing through which the shaft passes, comprising a sealing ring engageable with the shaft in leak-tight relation, a flexible diaphragm fixed at one end to the casing and at the other end engageable with said sealing ring, spring means bearing against said other end of the flexible diaphragm for holding it against said ring with sufficient force to prevent leakage between said sealing ring and said other end of the diaphragm, and means connected with said casing and disposed closely adjacent said diaphragm for limiting the movement thereof in either direction, whereby pressure changes on opposite sides of the diaphragm will not force the same away from said sealing ring.

4. A packing gland construction for a shaft, comprising a ring member closely encircling said shaft, sealing means connecting said ring member and the shaft, there being a pair of aligned apertures in opposite sides of said ring member, a lubricant inlet connected to one aperture and a lubricant outlet connected to the other aperture, said inlet and outlet apertures being disposed to one side of the axis of said shaft whereby rotation of the shaft tends to draw in lubricant through the inlet and to discharge lubricant through the outlet.

5. A shaft seal comprising spaced shoulders on the shaft, a casing surrounding the shaft between said shoulders, bearing rings seating endwise of the shaft against said shoulders, flexible sealing diaphragms extending from said casing to said rings and forming with the casing a fluid tight closure, said casing having intake and discharge openings for lubricant, a closed circulating lubricant system comprising a reservoir connected to said intake and discharge openings, and lubricant impelling means comprising a portion of the shaft between said shoulders for drawing lubricant in through the intake opening and discharging the same through said discharge opening to maintain a circulation of lubricant through said casing by rotation of the shaft.

HARRY E. LA BOUR.